United States Patent
Yebka et al.

(10) Patent No.: US 8,758,931 B2
(45) Date of Patent: Jun. 24, 2014

(54) ELECTROCHEMICAL CELL PACKAGE

(75) Inventors: Bouziane Yebka, Apex, NC (US);
Joseph Anthony Holung, Wake Forest, NC (US); Kenneth Scott Seethaler, Wake Forest, NC (US); Tin-Lup Wong, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 185 days.

(21) Appl. No.: 13/310,149

(22) Filed: Dec. 2, 2011

(65) Prior Publication Data
US 2013/0143077 A1 Jun. 6, 2013

(51) Int. Cl.
*H01M 2/04* (2006.01)
*H01M 2/00* (2006.01)
*H01M 4/00* (2006.01)

(52) U.S. Cl.
USPC ............... 429/176; 429/163; 429/61; 429/65; 429/66

(58) Field of Classification Search
USPC ........................................ 429/61, 65, 66, 127
See application file for complete search history.

(56) References Cited

U.S. PATENT DOCUMENTS

| | | | | |
|---|---|---|---|---|
| 4,992,344 A | * | 2/1991 | Coppers | 429/61 |
| 5,171,648 A | * | 12/1992 | Beard | 429/61 |
| 6,004,694 A | * | 12/1999 | Van Lerberghe | 429/53 X |
| 7,378,179 B2 | * | 5/2008 | Shimamura et al. | 429/53 |
| 7,811,703 B2 | * | 10/2010 | Fujita et al. | 429/209 |
| 2010/0068606 A1 | * | 3/2010 | Matthias | 429/61 |
| 2013/0059179 A1 | | 3/2013 | Hosaka et al. | |

FOREIGN PATENT DOCUMENTS

| | | |
|---|---|---|
| JP | 2000067846 | 3/2000 |
| JP | 2000260601 | 9/2002 |
| WO | 2011145608 A1 | 11/2011 |

OTHER PUBLICATIONS

Advanced Single or Dual Cell Lithium-Ion/Lithium-Polymer Charge Management Controllers, Microchip Technology, Inc., 2004 [DS21823C, 24 pages].

* cited by examiner

*Primary Examiner* — Maria J Laios
*Assistant Examiner* — Robert S Carrico
(74) *Attorney, Agent, or Firm* — Brian J. Pangrle

(57) ABSTRACT

A lithium-ion battery package can include flexible foil, a first conductor patch exposed on the flexible foil, a second conductor patch exposed on the flexible foil, a folded orientation of the flexible foil that includes a contact between the first conductor patch and the second conductor patch, and an expanded orientation of the flexible foil that includes a space between the first conductor patch and the second conductor patch. Various other apparatuses, systems, methods, etc., are also disclosed.

24 Claims, 11 Drawing Sheets

US 8,758,931 B2

ELECTROCHEMICAL CELL PACKAGE

TECHNICAL FIELD

Subject matter disclosed herein generally relates to technology for packages for housing one or more electrochemical cells.

BACKGROUND

Electrochemical cells include, for example, lithium-ion cells. Such cells can be repeatedly charged and discharged. Cycling of cells can be accompanied by gas generation. Where a cell is contained in a package, heating or generation of gas can make the package swell. Where a package is received by an electronic device or system, such an increase in volume may result in damage to the device or system. Various technologies and techniques described herein may address gas generation and optionally other aspects of electrochemical cell operations.

SUMMARY

A lithium-ion battery package can include flexible foil, a first conductor patch exposed on the flexible foil, a second conductor patch exposed on the flexible foil, a folded orientation of the flexible foil that includes a contact between the first conductor patch and the second conductor patch, and an expanded orientation of the flexible foil that includes a space between the first conductor patch and the second conductor patch. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
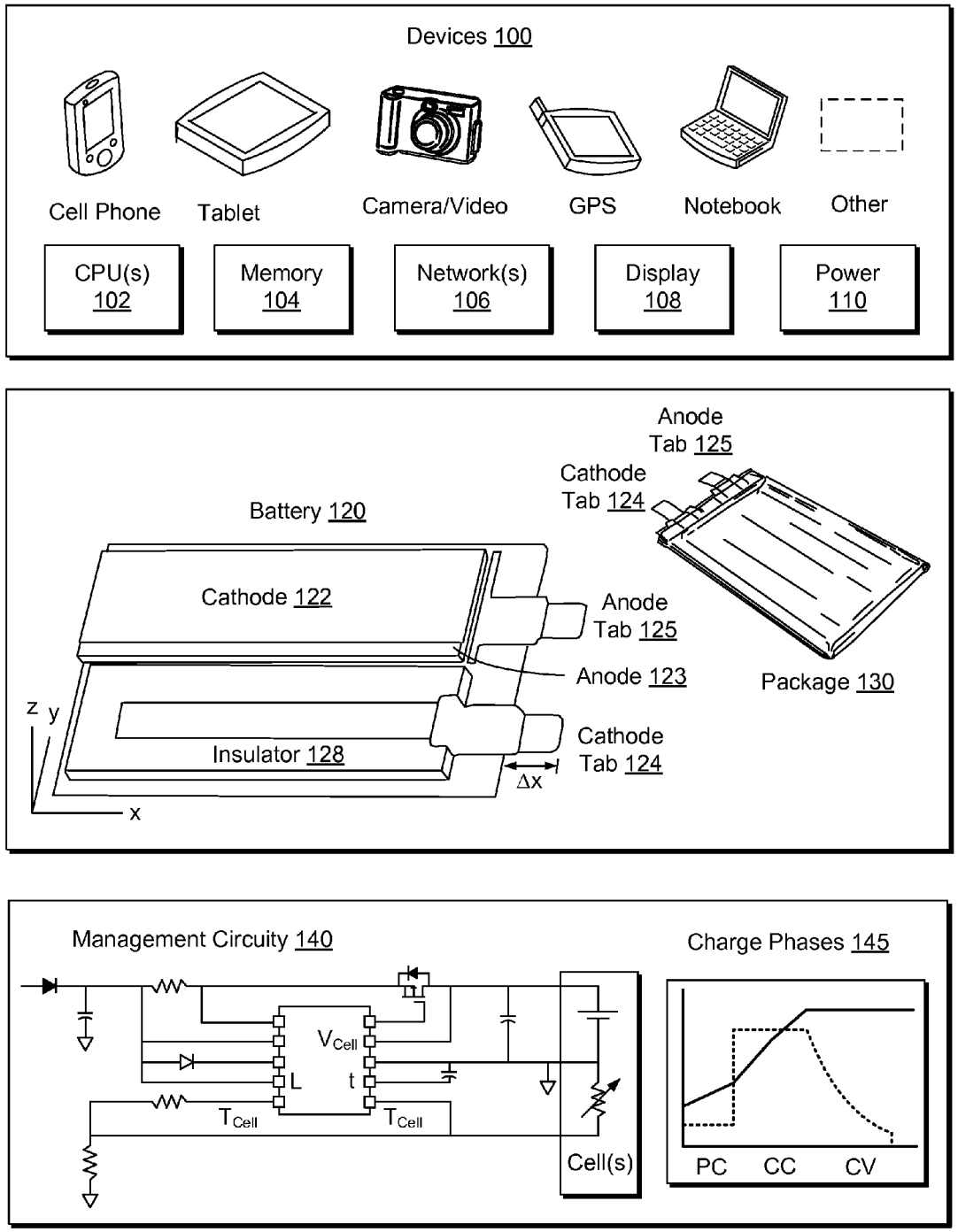
FIG. 1 is a diagram of various example devices, an example of a battery and a package for the battery, and an example of management circuitry.

FIG. 1 shows various electronic devices 100 as including, for example, one or more processors 102, memory 104, one or more network interfaces 106, a display 108 and power 110. As to power, an electronic device may include a socket, compartment, etc., for receipt of a battery 120, which may include one or more cells. In the example of FIG. 1, the battery 120 includes cathode 122, anode 123 and insulator 128 components as well as a cathode tab 124 and an anode tab 125. As shown in FIG. 1, the battery 120 may be packaged in a package 130. One of the electronic devices 100 may be powered by the battery 120 (e.g., as housed in the package 130) via electrical connection to the tabs 124 and 125.

As to the devices 100, examples can include a cell phone, a tablet, a camera/video device, a GPS device, a notebook device (e.g., notebook computer), or other device. As to other devices, as described herein, such devices can include battery powered vehicles (e.g., automobiles, toys, remote control devices such as bomb sniffers, drones, etc.).

As described herein, the battery 120 may include one or more Li-ion electrochemical cells. Various types of package formats exist for Li-ion batteries including flexible pouch formats (see, e.g., the package 130) and prismatic formats. As shown in the example of FIG. 1, the battery 120 includes various dimensions (e.g., x, y and z) where features such as the tabs 124 and 125 may extend outwardly from the "cell" portion of the battery 120 (see, e.g., dimension Δx). The package 130 accommodates the battery 120 while allowing the tabs 124 and 125 to remain available for electrical connection to a device. A package provided in a pouch format or a prismatic format may expand, for example, when the state-of-charge (SOC) level of a battery is high (e.g., overcharge) or when the SOC of a battery is low (over-discharge). A Li-ion battery may be managed to varying extent by management circuitry.

As shown in FIG. 1, management circuitry 140 includes an integrated circuit with 10 pins. The pins may include Charge Current Sense Input, Battery Management Input Supply, Charge Status Output, Logic Enable, Cell Temperature Sensor Bias, Cell Temperature Sensor Input, Timer Set, Cell Management 0V Reference, Cell Voltage Sense, and Drive Output. As to protection features, a cell temperature sensor bias feature may provide for a voltage reference to bias external thermistor for continuous cell temperature monitoring and prequalification while a cell temperature sensor input feature may provide for input for an external thermistor for continuous cell temperature monitoring and prequalification (optionally may be disabled by applying a set voltage) and safety timers (e.g., preconditioning, fast charge, elapsed time termination, etc.) may be scaled by a capacitor. A temperature-sensing circuit may have its own reference such that it is immune to fluctuations in the supply voltage input (e.g., where the temperature-sensing circuit is removed from the system when no supply is applied, eliminating additional discharge of cell(s)).

As to logic, a logic enable feature may provide for input that, for example, forces charge termination, initiates charge, clears faults or disables automatic recharge. For example, a logic-enable input pin (EN) may provide for features to terminate a charge anytime during the charge cycle, initiate a charge cycle or initiate a recharge cycle. A logic input (e.g., high or low) may signal termination of a charge cycle. A cell voltage sense can provide for monitoring voltage at, for example, a positive terminal of a cell (e.g., for single, dual, etc., series cell packs with coke or graphite anodes).

Also shown in FIG. 1 is an example of a charge phase plot 145 that indicates how charging may include a preconditioning phase (PC), a constant current phase (CC) and a constant voltage (CV) phase.

As described herein, management circuitry may operate stand-alone or in conjunction with one or more other circuits (e.g., a host controller, etc.). Management circuitry may apply constant current followed by constant voltage to charge one or more cells. As an example, charger circuitry may include a MPC7384X family chip (Microchip Technology, Inc., Chandler, Ariz.), which is described in a document entitled "Advanced Single or Dual Cell Lithium-Ion/Lithium-Polymer Charge Management Controllers" (Microchip Technology, Inc., 2004), which is incorporated by reference herein. As described herein, the term "lithium-ion" includes "lithium-polymer" as well as "lithium-ion polymer". Management circuitry may be provided with a battery, a package, a device, as part of dedicated power circuitry (e.g., a battery charger), etc.

Management circuitry may be configured to manage, to varying extent, state-of-charge (SOC) mismatch and capacity/energy (C/E); noting that as the number of cells and load currents increase, the potential for mismatch also increases. Though SOC may be more common, each type of mismatch problem limits capacity (mA·h) of a pack of cells to capacity of the weakest cell.

In the example of FIG. 1, the battery 120 may include a polymer composite material such as polyethylene oxide or polyacrylonitrile that includes lithium salt. Such a battery may be referred to as a lithium-ion battery or a lithium-ion polymer battery or a lithium-polymer battery (e.g., "LiPo battery" or "LiPo cell"). LiPo cells are sometimes referred to as laminate cells, which may be configured very thin or quite large depending on their intended use. One or more LiPo cells may be encased in a flexible aluminum foil laminate pouch (e.g., with a thickness on the order of about 0.1 mm). LiPo cells may include a stacked construction formed by stacking electrode and electrolyte materials in a flat sandwich (e.g., defined by length, width and height dimensions). Stacked layers may be packed in a package (e.g., the pouch package 130) in a flat, rolled or other configuration. LiPo cell capacities can include capacities in a range, for example of about 50 mA·hrs (e.g., for a small cell such as for a Bluetooth headset) to about 10 A·hrs or more for an electric vehicle (e.g., electric or hybrid).

As to function of a lithium-ion cell, lithium ions move from a negative electrode to a positive electrode during discharge and reversely when being charged. A LiPo cell can include a polyethylene (PE), a polypropylene (PP), a PP/PE, or other material as a separator. Some LiPo cells include a polymer gel containing an electrolyte solution, which is coated onto an electrode surface. For LiPo cells, close packing can allow for a high density.

While a LiPo cell package may be flexible, bending should be minimized or avoided as bending brings the housed anode and cathode materials closer together, which can cause preferential plating and shorting, which can reduce cycle life and present a potential safety hazard.

Various phenomena can cause gassing or gas expansion of a LiPo cell package. For example, a puncture can cause an internal short circuit, which may cause the cell to get hot. Further, even if a cell does not short, a leak may allow moisture in, which may eventually cause self-discharge. A cell may also generate gas from reaction of an anode with moisture.

Another issue for LiPo packages is edge shorting. Edge shorting can occur, for example, where an aluminum layer of a package is conducting and, if exposed at a cut edge of the package, can short out via contact with one or more neighboring components. Yet another issue is related to internal corrosion reactions in a cell, which can occur if tabs to an aluminum layer are shorted, which may happen, for example, if one or more tabs are bent over an edge of a package.

For LiPo cells, when cell voltage drops to a low value (e.g., about 1.5 V), reactions at an anode can produce gas (e.g., over-discharge). If voltage continues to drop (e.g., under about 1 V), copper of an anode current collector can start to dissolve and may short out a cell.

When cell voltage increases to a high value (e.g., about 4.6 V), gassing may occur at a cathode as electrolyte may start to decompose (e.g., overcharge). While a lithium ion (not LiPo) cylindrical cell may include an integral pressure-activated current-interrupt device (CID) to stop overcharge in response to gas pressure, conventional LiPo cells do not include a CID. Although swelling of a LiPo package may help to prevent further overcharge by increasing cell impedance, as a final failsafe, such a condition is suboptimal. Some LiPo cells may be connected to an external thermal fuse for overcharge protection (e.g., in addition to the control by management circuitry).

For lithium-ion cells, an external short circuit can cause swelling due to heat and over-discharge (e.g., too low of a cell voltage). Non-LiPo cylindrical cells can include an integral positive thermal coefficient (PTC), a device that expands and creates high impedance when it is heated or self-heats due to the high currents experienced during an external short circuit. Conventional LiPo cells do not include an integral PTC; noting that some LiPo cells rely on an external PTC or thermal fuse for shorting protection.

LiPo cell packages tend to be more expensive per watt hour compared to other types of Li-ion cells for several reasons. First, high-quality laminate material and special tabs that allow sealing against a package tend to be expensive; second, the lower speed of manufacturing increases both labor and overhead costs; and third, while lower production runs allow for size flexibility, this can result in lower yields and higher prototyping costs.

As described herein, in various examples, packages for one or more LiPo cells can include features that respond to gassing. For example, a package can include one or more interruptible conductor pathways, one or more gas relief openings or one or more interruptible conductor pathways and one or more gas relief openings.

Figure 2:
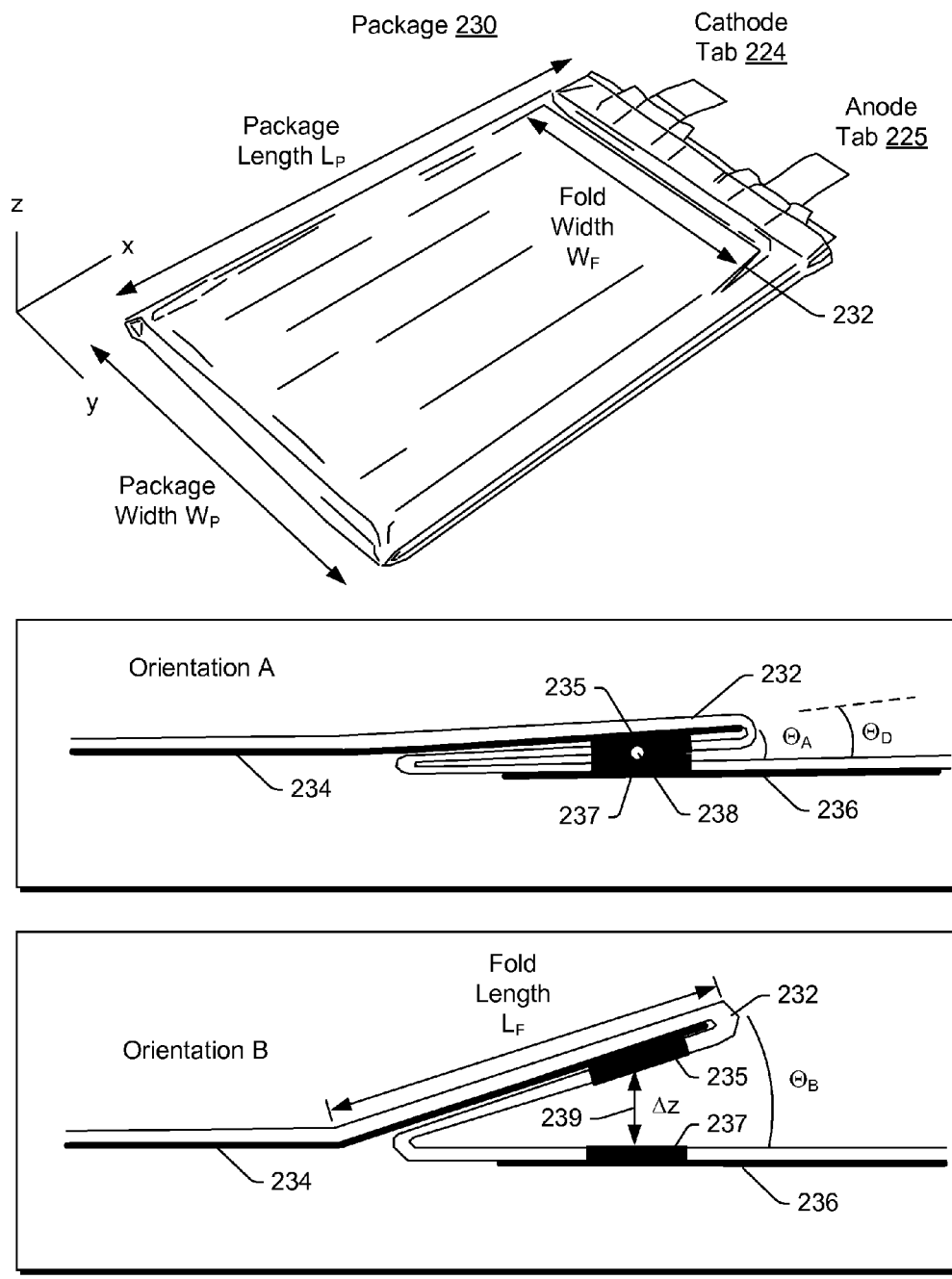
FIG. 2 is a diagram of an example of a package feature that allows for interrupting a conductive pathway.

As shown in FIG. 2, a lithium-ion battery package 230 includes a cathode tab 224, an anode tab 225, a flexible foil 232, a conductor 234, a first conductor patch 235 exposed on the flexible foil 232, a conductor 236, a second conductor patch 237 exposed on the flexible foil 232, a folded orientation of the flexible foil that includes a contact 238 between the first conductor patch 235 and the second conductor patch 237, and an expanded orientation of the flexible foil that includes a space 239 between the first conductor patch 235 and the second conductor patch 237.

In the example of FIG. 2, the folded orientation "A" may be defined in part by an angle $\Theta_A$ as the fold may not lie completely flat with respect to a surface of the package 230. In the orientation "B", another angle, $\Theta_B$, is shown where a distance $\Delta z$ exists between the conductor patches 235 and 237. Between these two angles exists a disable angle $\Theta_D$, which corresponds to formation of a space between the conductor patches 235 and 237 such that they no longer contact (see, e.g., dashed line in orientation "A"). The orientation "B" may correspond to an expanded orientation due, for example, to gas build up within the package. Gas pressure within a package may cause a fold or flap angle to exceed a disable angle, which may provide some additional measure of protection as the space between conductor patches is increased (e.g., to avoid risk of arcing, etc.).

As described herein, if a LiPo cell begins to swell, electrical contact can be broken when overlapping surfaces that include two contact patches are separated to, at least in part, electrically disable the cell (e.g., material unfolds to accommodate swelling and also disconnect the cell electrically as contact surfaces separate).

Figure 11:
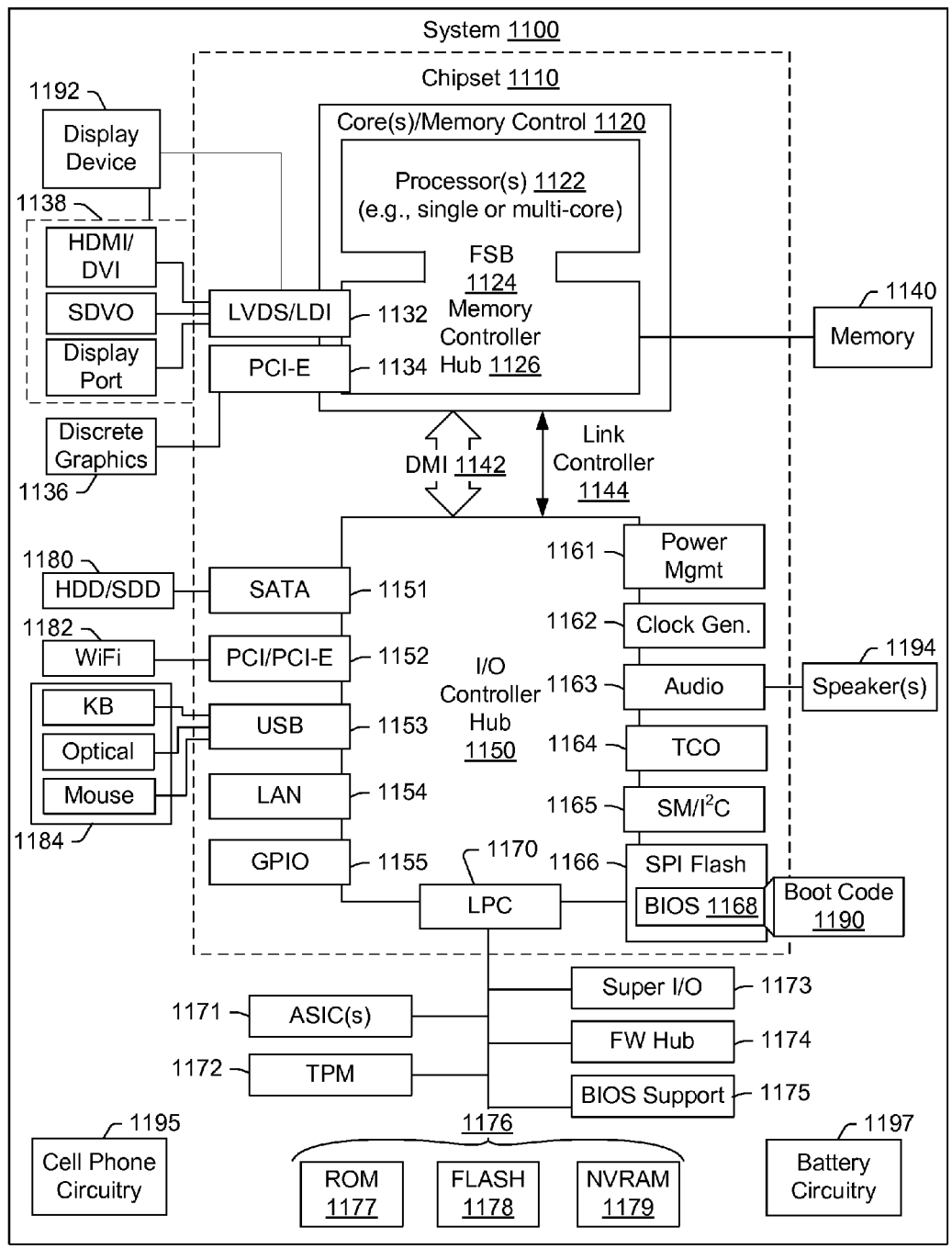
FIG. 11 is a diagram of an example of a system that includes one or more processors.

As described herein, one or more features of a package may optionally provide a signal (e.g., current, voltage, interrupt, etc.) to management circuitry such as the management circuitry 140 of FIG. 1. For example, a conductive pathway may provide a signal to a pin of a circuit (or indirectly via other circuitry) and upon disconnect of the conductive pathway, the signal to the pin may be interrupted. In turn, the circuit may act to avoid delivery of power to the battery (e.g., to charge the battery) or may take one or more other actions, optionally associated with a device (see, e.g., the devices 100). As indicated in FIG. 11, a system 1100 may optionally include circuitry for or associated with battery management circuitry.

Figure 3:
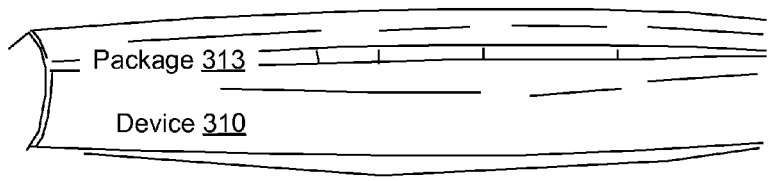
FIG. 3 is a diagram of various scenarios of damage caused by expansion of a battery package.
Figure 3:
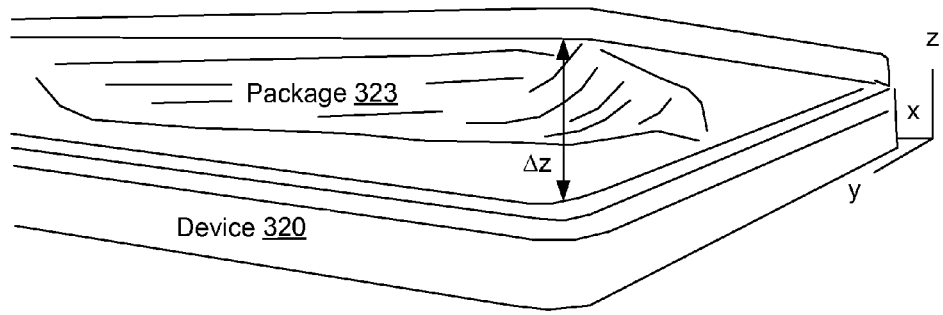
Figure 3:
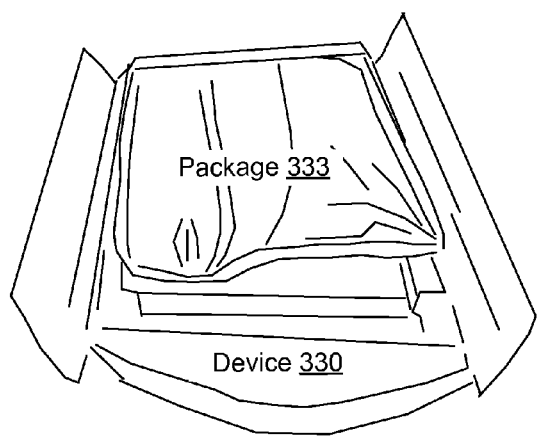

When inserted in a recess, compartment, etc., of a device, such packages (e.g., the package 230 of FIG. 2) can help minimize or avoid damage to the device. FIG. 3 shows some examples of damage that can occur when a packaged LiPo battery expands inside a device where the packaged LiPo battery does not include features for expansion, disconnect, gas relief, etc. In scenario 301, a device 310 is split open due to expansion of a package 313, in scenario 302, a device 320 is split open due to expansion of a package 323, and in scenario 303, a device 330 is split open due to expansion of a package 333. In such scenarios, the devices 310, 320 and 330 may be damaged beyond repair (e.g., based on an economic analysis).

As shown in the scenario 302, a case of the device 320 is forced open along one edge to a distance Δz. The asymmetric nature of how the package 323 expands can twist components of the device 320 and lead to irreparable damage to such components. As described herein, a package may include features (e.g., folds or other expansion features) that provide a predetermined expansion profile such that damage to one or more components of a device is limited or avoided.

For example, a package may include features that allow for symmetric expansion such that force is applied evenly to a surface of a device until one or more conductive pathways become disabled (e.g., disconnected). In such an example, one fold may be an expansion fold without conductive pathway disconnect features (e.g., a fold akin to the fold 232 of FIG. 2 positioned near the end of the package 230 opposite the tabs 224 and 225) while another fold may be an expansion fold with conductive pathway disconnect features (see, e.g., the fold 232 of FIG. 2). Such folds may optionally be arranged symmetrically with respect to a surface or surfaces of a package where one or more of the folds include disconnect features, gas relief features, etc. In other words, structural features of each fold may differ from one or more of the other folds. As an example, a package may include four folds where two include gas relief features (e.g., for escape of gas) and where two include disconnect features (e.g., to disconnect one or more conductive pathways).

Where a package includes an interruptible contact, such as the contact 238 of the example of FIG. 2, once some amount of expansion occurs, further expansion can be mitigated by disconnecting one or more conductors of a battery responsive to the expansion.

Figure 4:
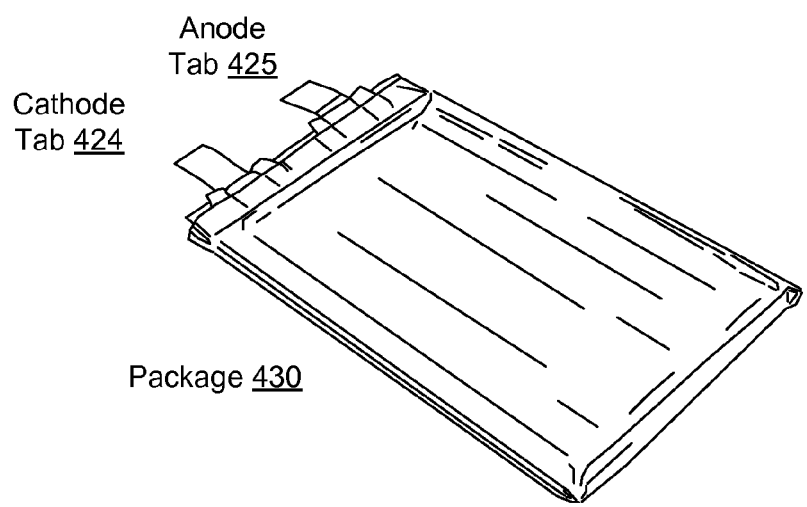
FIG. 4 is a diagram of examples of package features.
Figure 4:
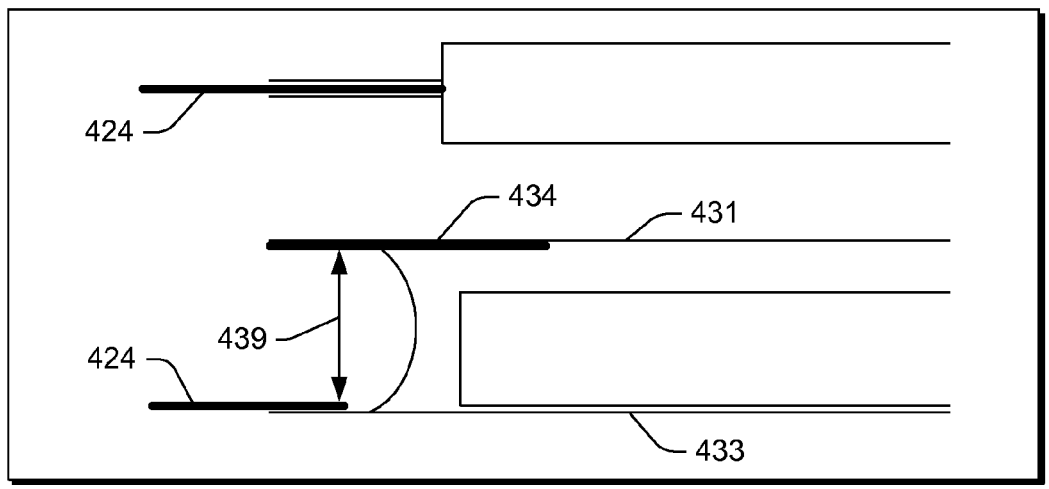
Figure 4:
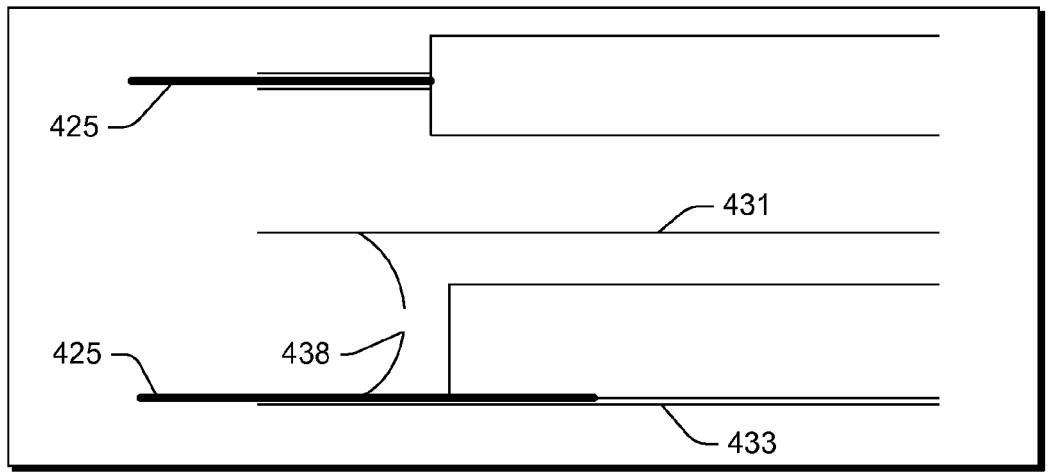

FIG. 4 shows an example of a package 430 that includes one or more interruptible conductive pathways. As shown, the package 430 includes a cathode tab 424 and an anode tab 425 where the cathode tab 424 includes an interruptible conductive pathway. In the example of FIG. 4, the interruptible conductive pathway includes a conductor 434 fixed to an inner surface of an upper layer 431 of the package 430 while the cathode tab 424 is fixed to an inner surface of a lower, opposing layer 433 of the package 430. Upon expansion of the package 430 (e.g., due to gas pressure), the upper layer 431 and the lower layer 433 become spaced apart 439 to thereby interrupt a cathode conductive pathway. As to the anode tab 425, an anode conductive pathway may be maintained (e.g., to avoid an ungrounded situation). In the example of FIG. 4, a portion of the package 430 may include one or more openings such as an optional opening 438 that provides for gas relief when the upper layer 431 and the lower layer 433 become spaced apart. Such an opening may be covered by a gas permeable membrane that acts to allow gas to pass while retaining liquid, gel, etc.

Figure 5:
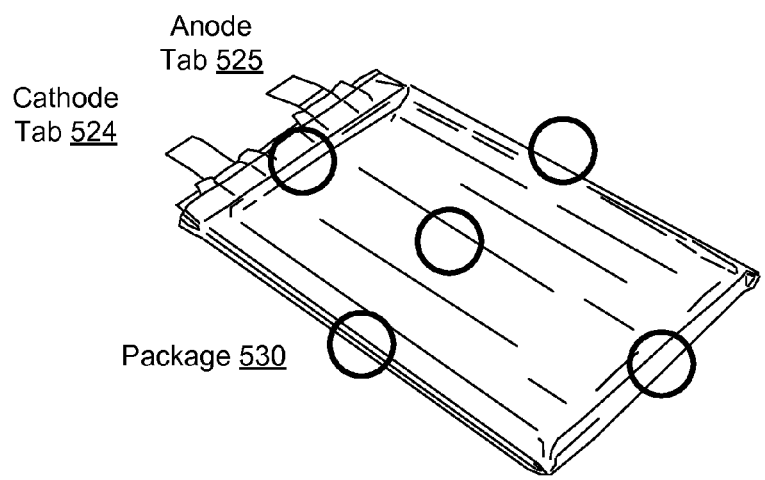
FIG. 5 is a diagram of examples of package features.
Figure 5:
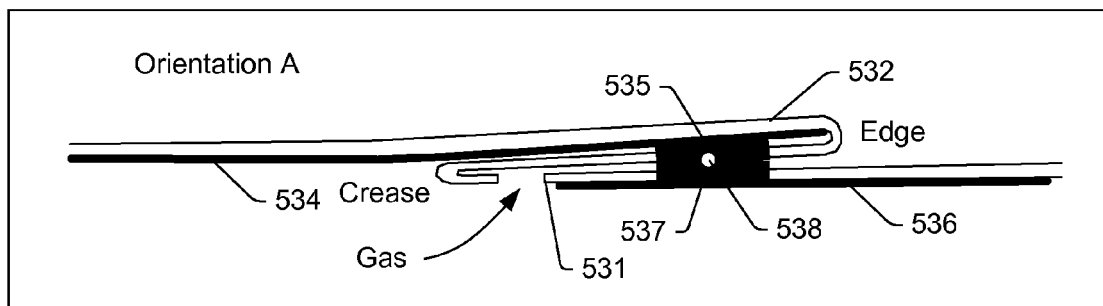
Figure 5:
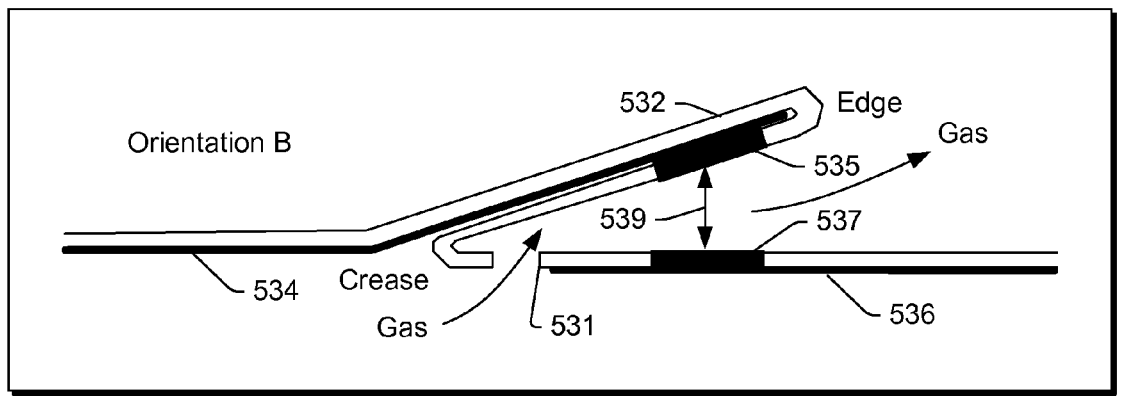

FIG. 5 shows an example lithium-ion battery package 530 that includes a cathode tab 524, an anode tab 525, a flexible foil 532, a conductor 534, a first conductor patch 535 exposed on the flexible foil 532, a conductor 536, a second conductor patch 537 exposed on the flexible foil 532, a folded orientation of the flexible foil that includes a contact 538 between the first conductor patch 535 and the second conductor patch 537, and an expanded orientation of the flexible foil that includes a space 539 between the first conductor patch 535 and the second conductor patch 537. The package 530 further includes an opening 531 for passage of gas through the flexible foil 532. In the example of FIG. 5, the opening 531 is disposed toward a crease side of the patches 535 and 537; noting that in another example, an opening may be disposed toward an edge side of contact forming patches. In either instance, gas pressure may act to lift an edge and thereby separate conductor patches to interrupt one or more conductor pathways (e.g., conductive pathways). As indicated by open circles with respect to the package 530, such an interrupt mechanism may be located at one or more positions on a package. Such a mechanism may help avoid the types of damage shown in the example scenarios of FIG. 3. In the example of FIG. 5, gas relief and interruption of one or more conductor pathways may occur simultaneously. For example, gas pressure may build in a sealed region that includes a contact formed by two conductor patches. Once the gas pressure reaches a certain level, the region may become unsealed and simultaneously the conductor patches may become spaced to thereby interrupt a conductor pathway (e.g., conductive pathway).

As described herein, conductor patches optionally include a material that acts to cause adhesion between the conductor patches and maintain contact therebetween. As described herein, a package optionally includes a material that acts to cause adhesion between surfaces, which may act to maintain contact between conductor patches, maintain an opening in a closed configuration, etc. As described herein, adhesive tape may be used to maintain contact between conductor patches, maintain an opening in a closed configuration, etc. (e.g., single side adhesive, optionally placed over an edge of a fold, or double side adhesive, optionally placed inside a fold, etc.) Such tape may be of sufficient size, properties, etc., such that a predetermined amount of force may be estimated as being required before the tape gives way (e.g., breaks, detaches, etc.).

As shown in the example of FIG. 5, one or more openings or vents can be incorporated into a package (e.g., perforations within a folded over region of a packaged cell can be exposed when the cell begins to swell thus allowing gases to escape). As described herein, a fold can be included in a package, with or without vents. For example, where a vent is included, a vent may have a closed state for a folded orientation of a package and an open state for an expanded orientation of the package.

As described herein, a lithium-ion battery package can include flexible foil, a first conductor patch exposed on the flexible foil, a second conductor patch exposed on the flexible foil, a folded orientation of the flexible foil that includes a contact between the first conductor patch and the second conductor patch, and an expanded orientation of the flexible foil that includes a space between the first conductor patch and the second conductor patch. Such a package may include a polymer laminated aluminum foil. Such a package may house one or more lithium-ion battery cells.

As described herein, a lithium-ion battery package can include a side formed at least in part by overlapping portions of flexible foil where a first conductor patch is exposed on one of the overlapping portions and where a second conductor patch is exposed on another one of the overlapping portions. Such a side may be a battery terminal side.

As described herein, a conductor patch may be in a conductive pathway for a battery terminal. For example, to provide a battery terminal with a connected state dependent on existence of contact formed by the patch and a disconnected state dependent on existence of a space between the patch and a conductor (e.g., another patch, etc.). As described herein, a lithium-ion battery package can include a positive battery terminal and a negative battery terminal where a first conductor patch and a second conductor patch provide for conduction of electricity either to the positive battery terminal or to the negative battery terminal.

As described herein, a lithium-ion battery package can include flexible foil formed, at least in part, with a cup. In such an example, the flexible foil can include a cover portion, foldable to cover the cup. When covered, the flexible foil may form a pouch for housing one or more cells of a battery.

Figure 6:
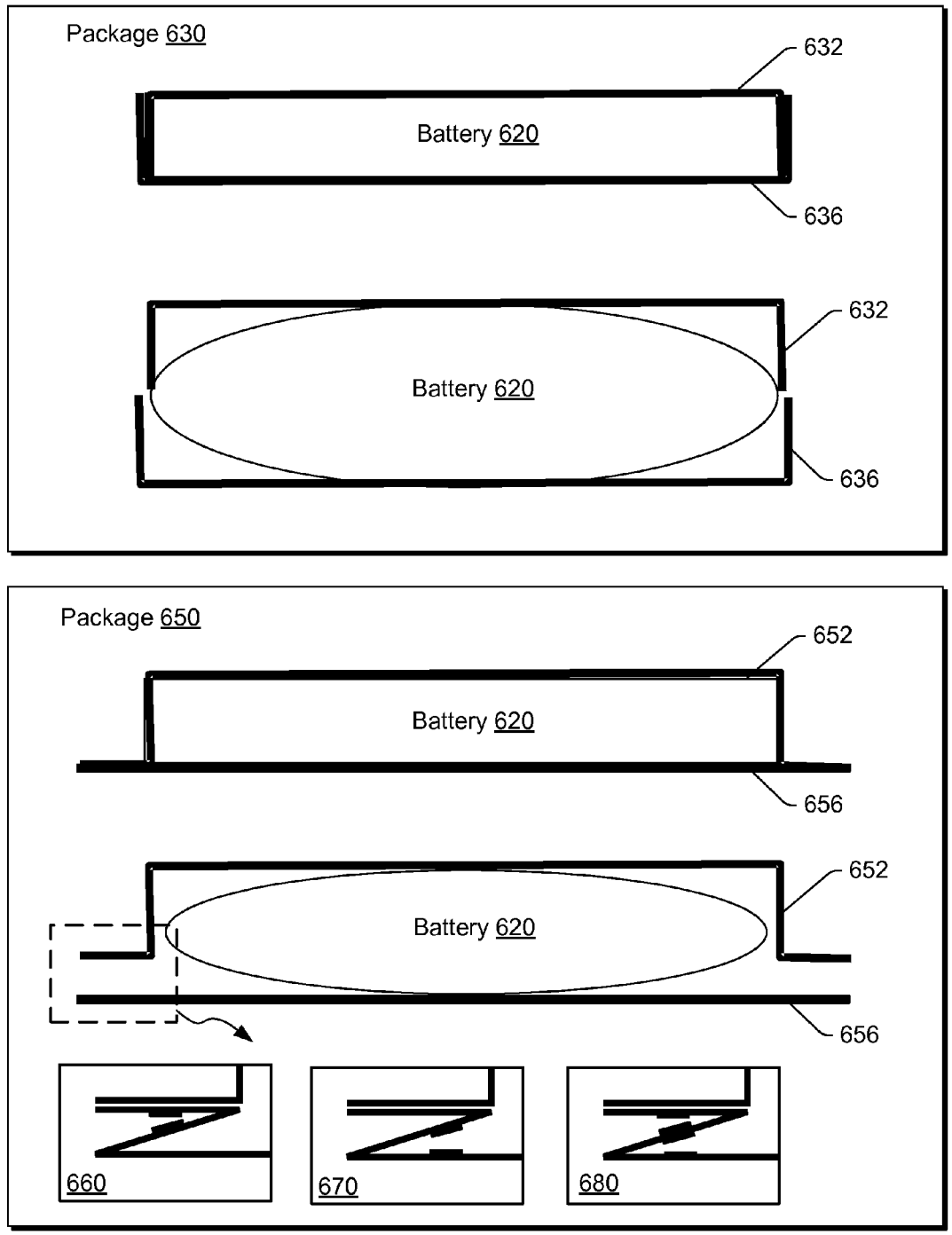
FIG. 6 is a diagram of examples of packages for packaging a battery.

FIG. 6 shows example packages 630 and 650 that provide for interruption of one or more conductor pathways, gas relief or interruption of one or more conductor pathways and gas relief. For the package 630, nested components 632 and 636 move as a battery 620 expands. For example, the nested components 632 and 636 may include one or more conductor patches along adjacent surfaces that translate with respect to each other as gas pressure causes the components 632 and 636 to alter their orientation. Gas relief may be achieved by one or more gas relief openings that open due to movement, by locating gas relief openings on components 632 and 636 that align due to movement, by gaps between components 632 and 636 created by movement, etc. An order may be established as to gas relief and conductor interrupt by appropriately configuring features of one or more of the components 632 and 636. For example, conductor interrupt may occur, which may mitigate gas generation and alleviate a need for gas relief. However, if gas generation still occurs, then the components may move further such that a gas relief mechanism is activated (e.g., an aperture moves to allow escape of gas, a gap occurs for escape of gas, etc.).

As to the example package 650, components 652 and 656 cooperate along a rim of the component 652 and a surface border of the component 656. Such cooperation may provide for interruption of one or more conductor pathways, gas relief or interruption of one or more conductor pathways and gas relief. Additional examples of disconnects are shown in several enlarged views 660, 670 and 680, where conductor patches (e.g., exposed conductive material, etc.) may become spaced apart responsive to gas release by one or more cells in a package. In the example disconnect 660, the patches are located to be exposed exteriorly, in the example disconnect 670, the patches are located to be exposed interiorly and, in the example disconnect 680, the patches are located to be exposed interiorly and exteriorly. In the example 680, if liquid, gel or other material were to bridge the space between the interior patches, the exterior patches would provide a secondary mechanism to disconnect a conductive pathway, which may be the same or different than a pathway associated with the interior patches.

As mentioned with respect to the example of FIG. 5, adhesive material may be used to provide for a predetermined amount of force to buildup before one or more components move. Such material may be used in conjunction with the example packages 630 and 650 of FIG. 6. For example, a surface of the component 632 or the component 652 may be treated with an adhesive material that binds to a surface of the component 636 or the component 656, respectively, or vice versa.

As described herein, the example package 630 may be fit with a coefficient of friction between the components 632 and 636 such that an amount of force is required before the friction force is overcome. Such a force may optionally account for temperature and thermal expansion of components.

With respect to temperature, one or more of the components 632 and 636 may be constructed from a material that allows for relatively friction free movement at an operational temperature of a battery. For example, the component 636 may have a greater thermal coefficient of expansion than the component 632 such that at an elevated temperature a gap may exist between the components that allows for movement, gas relief or movement and gas relief. For such an example, at room temperature or what may be considered an ordinary or low temperature, the components may be fixed by some amount of friction (e.g., a press or interference fit).

In the examples of FIG. 6, one or more components may be made of a material such as a polymer matrix that does not allow for deformation. For example, a component (e.g., package material) could be made with engineered properties that expose fissures when the pressure reaches a design threshold. In such an example, fragilities may be imparted naturally or by manufacture (e.g., thin walled portions, machined grooves, etc.) where such fragilities break and allow for release of gas, interruption of one or more conductor pathways or release of gas and interruption of one or more conductor pathways.

As described herein, a lithium-ion battery can include an expandable package and a disconnect to disconnect a conductive pathway of a terminal of the lithium-ion battery responsive to expansion of the package. Such an expandable package may be a flexible foil package, include one or more nesting components, etc.

Figure 7:
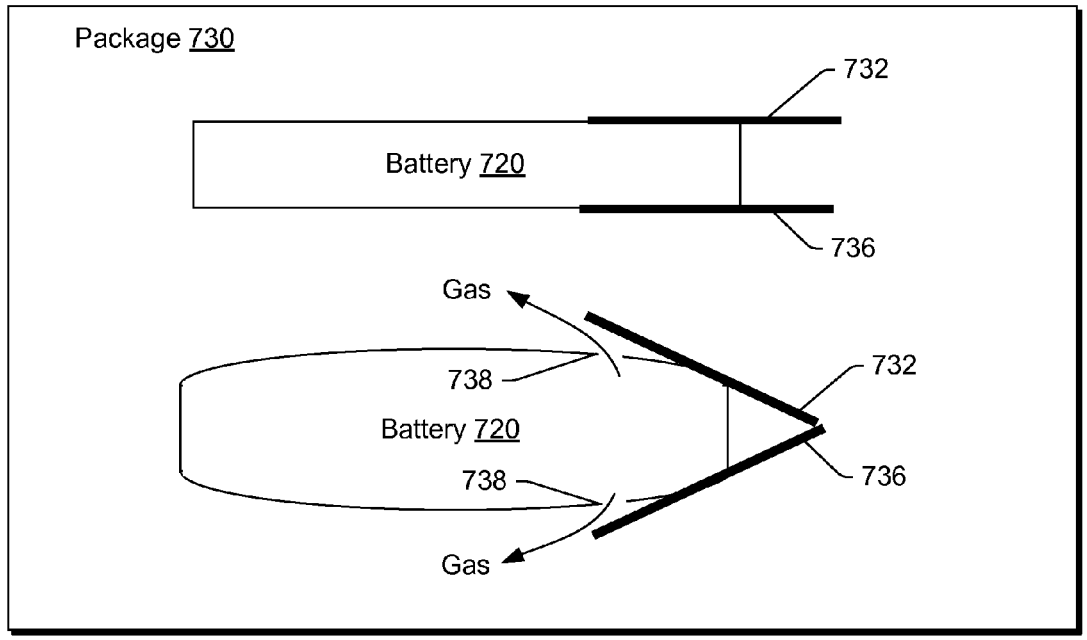
FIG. 7 is a diagram of examples of components that can cooperate with an expandable package.
Figure 7:
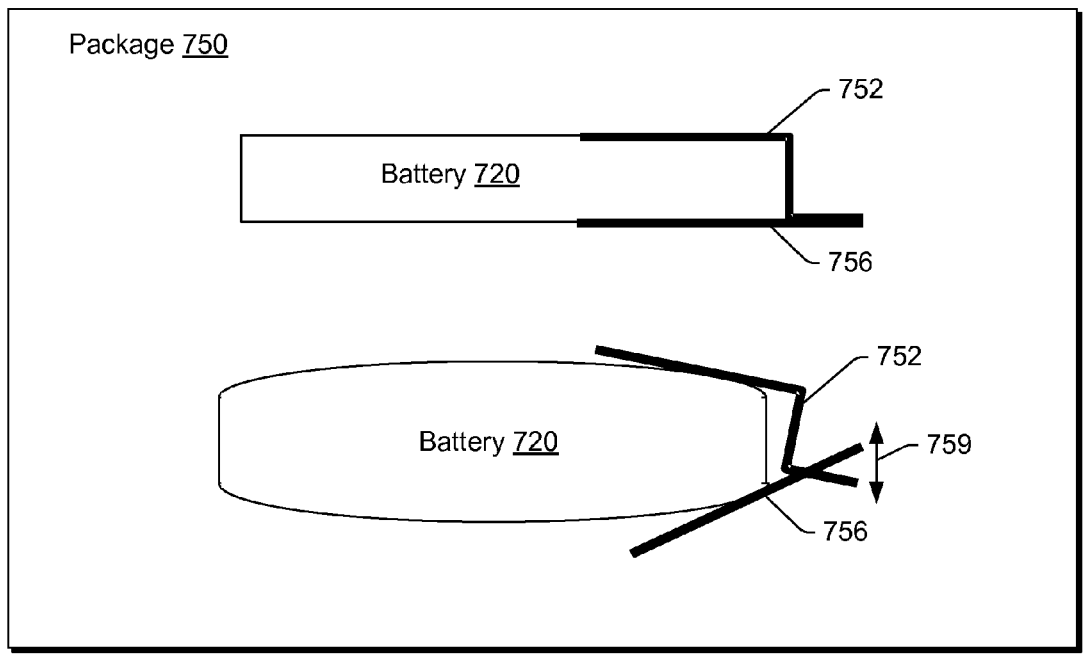

FIG. 7 shows example packages 730 and 750 that provide for interruption of one or more conductor pathways, gas relief or interruption of one or more conductor pathways and gas relief. For the example package 730, as gas expands the battery 720, rigid attachments 732 and 735 change angle and allow for gas escape via openings 738. For the example package 750, as gas expands the battery 720, rigid attachments 752 and 756 change angle such surfaces of the attachments 752 and 756 become spaced apart 759. In the example of FIG. 7, the package 730 or the package 750 may include a tear-away portion that is torn away by a change in angle of a rigid component. As described herein, a rigid component may optionally include a sharp point or edge that acts to puncture a package expanding due to gas generation to thereby relieve gas pressure.

As described herein, a package may include one or more external devices such as clips. For example, a clip may be attached to a pouch cell where relative motion of the clip triggers operation of a vent or interrupt or both. The components 732 and 736 and 752 and 756 in the examples of FIG. 7 may be clips. Such components may be configured for implementation on a conventional package. For example, given a conventional package, for added protection, a clip or clips may be positioned that interact with the package (e.g., surface, layers, tabs, etc.) responsive to conditions such as temperature, pressure or temperature and pressure to thereby relieve gas, interrupt a conductor pathway or to relieve gas and interrupt a conductor pathway. Such clips may be configured with a fixed geometry or a geometry that is altered in response to, for example, swelling of a package. For a fixed geometry clip, a puncture or interrupt or puncture and interrupt mechanism may be activated by changing shape of a package (e.g., as a package expands, geometry change of the package causes activation of features of a clip). For example, the components 752 and 756 may be a clip, optionally biased by a spring mechanism, where the component 752 (or 756) includes a sharp feature (e.g., edge, prong, etc.) that puncture a battery pouch as the pouch expands and contacts the sharp feature. In such a manner, the clip can relieve gas pressure and reduce pressure-volume induced damage to a device (see, e.g., FIG. 3).

Figure 8:
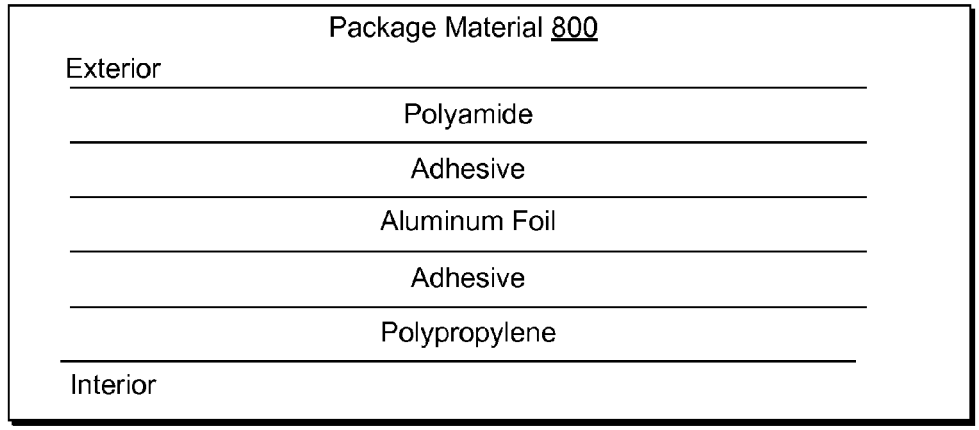
FIG. 8 is a diagram of an example of package material, an example of conductor patches with respect to the package material and some examples of packages.
Figure 8:
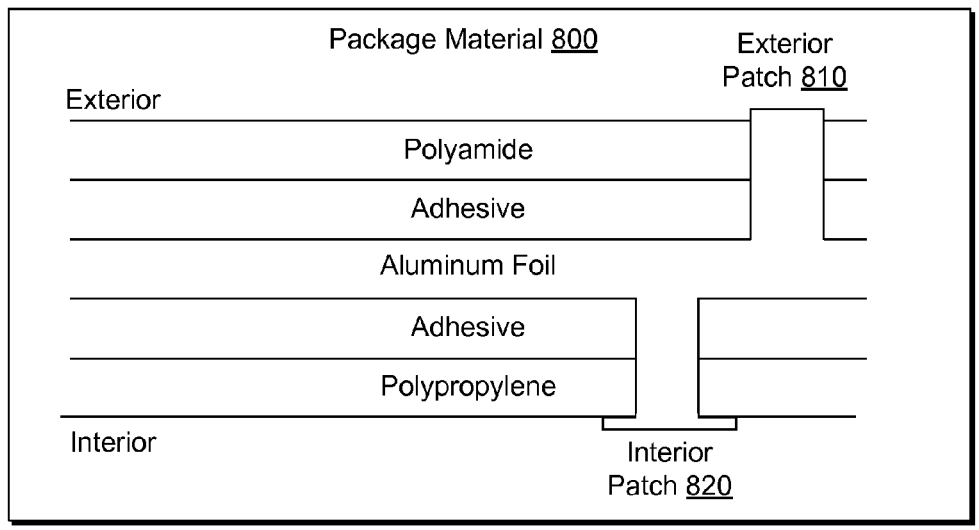
Figure 8:
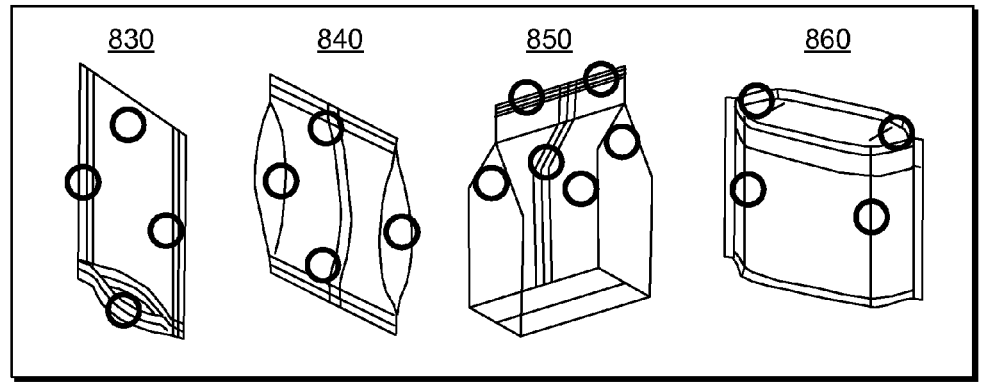

FIG. 8 shows an example of a package material 800 that includes multiple layers along with some examples of packages 830, 840, 850 and 860 that may optionally be formed from the package material 800 (e.g., or other package material). As shown, from exterior to interior, the example package material 800 includes a polyamide layer, an adhesive layer, an aluminum foil layer, an adhesive layer and a polypropylene layer. The polyamide layer may have a thickness of about 0.025 mm, adhesive layer may be a polyester-polyurethane adhesive applied at about 4 $g \cdot m^{-2}$, the aluminum foil layer may have a thickness of about 0.040 mm, the second adhesive layer may be a urethane-free adhesive applied at about 2 $g \cdot m^{-2}$, and the polypropylene layer may have a thickness of about 0.040 mm. Overall thickness may be about 100μ.

As shown in FIG. 8, one or more patches may be formed using the package material 800. For example, an exterior patch 810 may be formed by removing layers exterior to the aluminum foil layer while an interior patch 820 may be formed by removing layers interior to the aluminum foil layer. Additional conductive material may be applied to fill in the removed material and to create an enlarged surface for forming a contact (e.g., as shown with respect to the interior patch 820).

As shown in FIG. 8, the package 830 includes an optionally expandable edge at one end and a closed opposing end, the package 840 include opposing surfaces connected at opposing ends that may expand away from each other along their sides, the package 850 includes opposing surfaces connected at one end along a flat portion and connected at another end along a box portion where expansion may occur between the opposing surfaces along angled portions, and the package 860 includes opposing surfaces connected at opposing ends with angle portions adjacent to each end where the opposing surfaces may expand with respect to each other. Open circles show examples of some locations where features may be located to provide for one or more of expansion, disconnect or gas relief.

Figure 9:
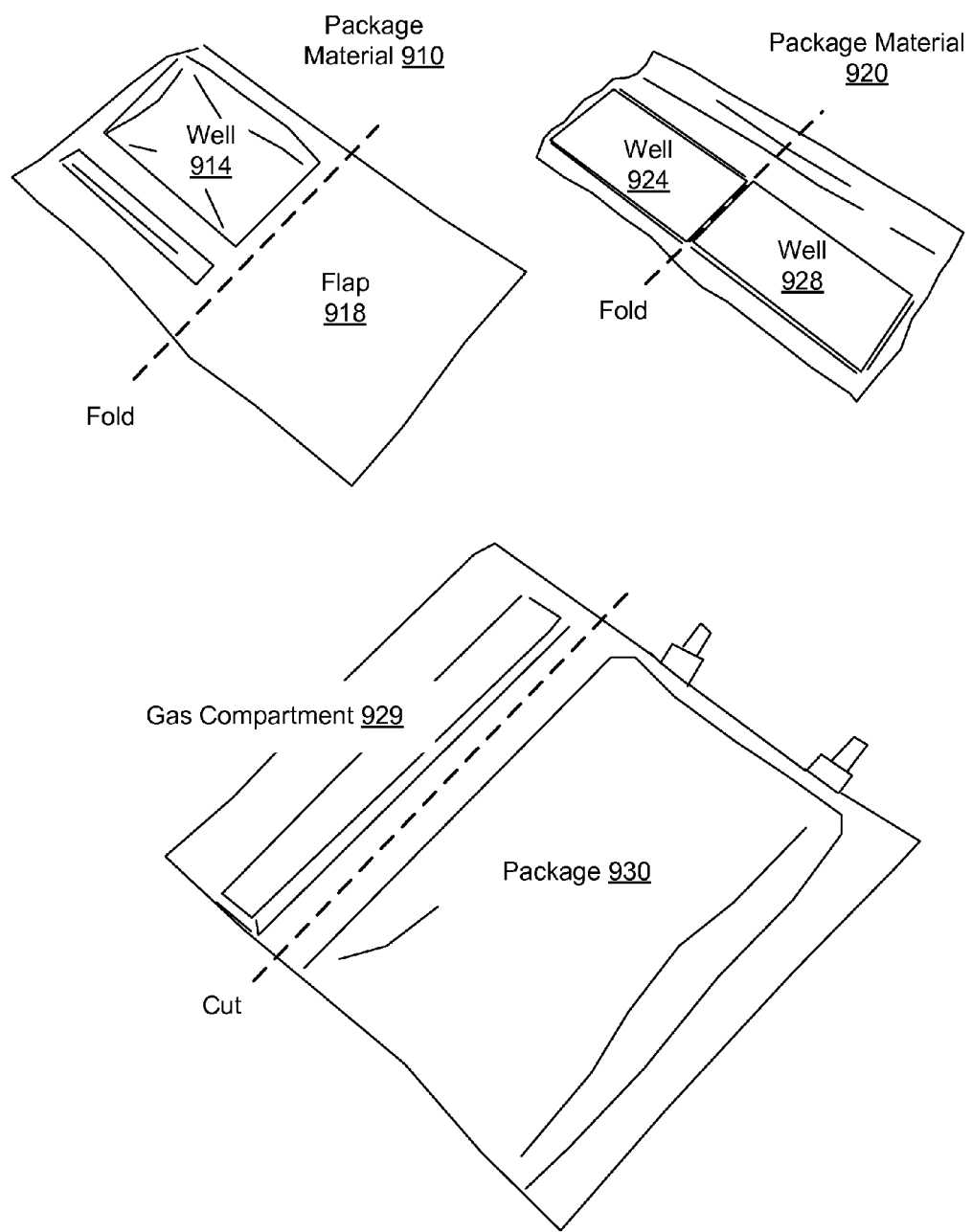
FIG. 9 is a diagram of examples of package material and an example of a package.

FIG. 9 shows an example of packaging material 910 that includes a well 914 to be covered by folding of a flap 918 over the well 914 to package a battery, an example of packaging material 920 that includes upper and lower well portions 924 and 928 to be folded to package a battery and an example of a package 930 that packages a battery, as formed using the packaging material 910 (e.g., cutting off a portion of the packaging material 910 that includes a gas chamber 929).

As described herein, the packaging material 910 or 920 may include features to form one or more conductor pathway interrupts, one or more vents (e.g., openings for escape of gas), or one or more conductor pathway interrupts and one or more vents. The packaging material 910 or 920 may include one or more folds for purposes of expansion due to gas pressure, optionally with or without other features (e.g., a conductor pathway interrupt, vent, etc.).

Figure 10:
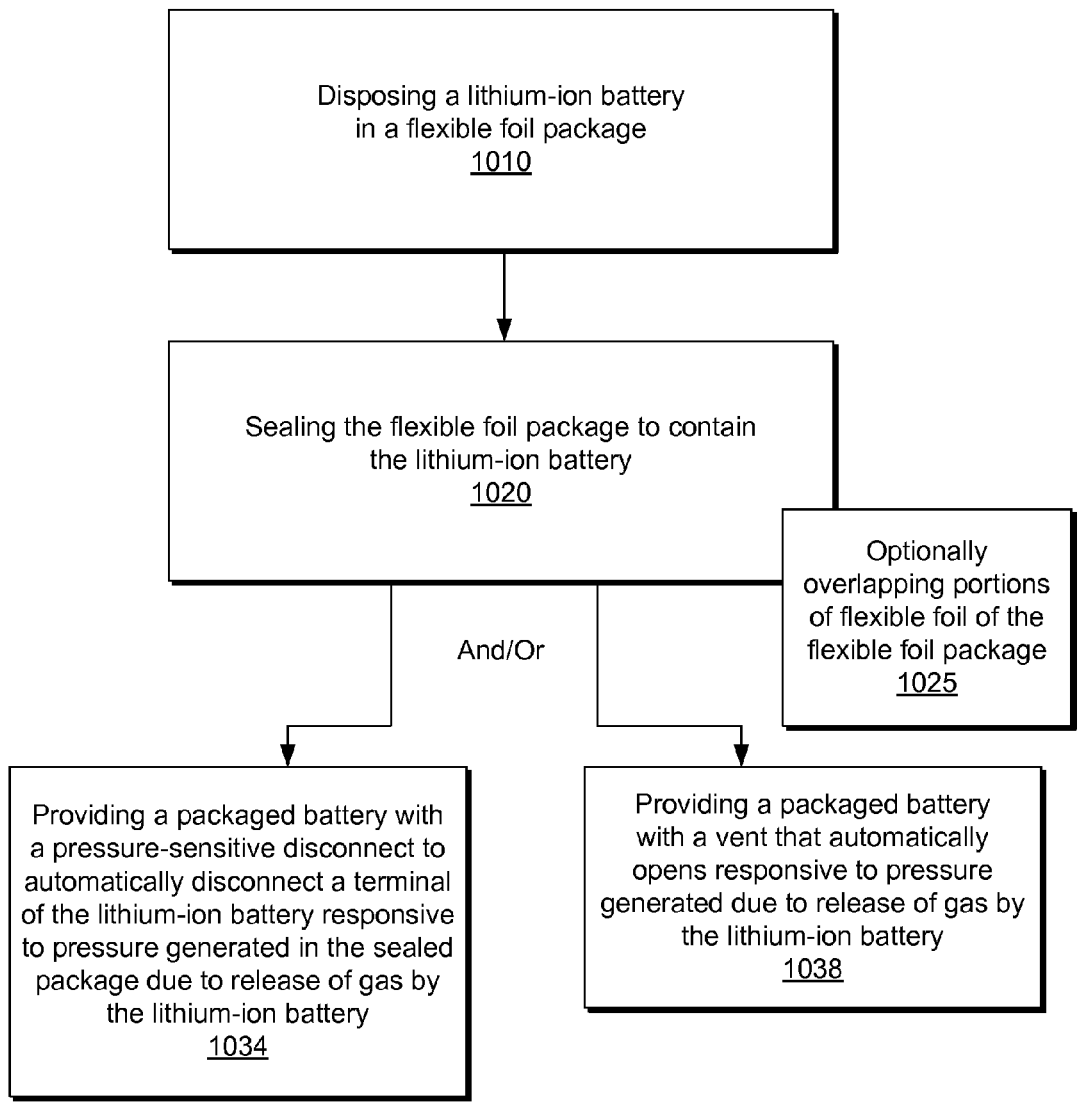
FIG. 10 is a diagram of an example of a method.

FIG. 10 shows an example of a method 1000 that includes a disposition block 1010 for disposing a lithium-ion battery in a flexible foil package and a seal block 1020 for sealing the flexible foil package to contain the lithium-ion battery. As shown, the seal block 1020 may optionally include an overlap block 1025 for overlapping portions of flexible foil of the flexible foil package. The method 1000 may be performed to provide a packaged battery that includes a pressure-sensitive disconnect to automatically disconnect a terminal of the lithium-ion battery responsive to pressure generated in the sealed package due to release of gas by the lithium-ion battery per a provision block 1034, to provide a packaged battery that includes a vent that automatically opens responsive to pressure generated due to release of gas by the lithium-ion battery per a provision block 1038 or a combination of both a pressure-sensitive disconnect and a vent.

As described herein, a package may include folds that can relieve pressure building-up inside the package (e.g., by increasing volume). Such a package may include one or more accordion folds (see, e.g., FIGS. 3 and 5), sliding components (see, e.g., FIG. 6), or other features that allow for an increase in volume. As described herein, a package may include packaging material (e.g., one or more components or features) that has special sensitivity to pressure and/or temperature.

As described herein, a system can include system components and a lithium-ion battery that includes an expandable package and a disconnect to disconnect a conductive pathway of a terminal of the lithium-ion battery responsive to expansion of the package. In such an example, the system may be an information handling device where the system components include one or more processors. As described herein, a system may be an electric vehicle (e.g., where system components include one or more electric motors that move the vehicle). Such a vehicle may be an automobile.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

While various examples of circuits or circuitry have been discussed, FIG. 11 depicts a block diagram of an illustrative computer system 1100. The system 1100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1100. As described herein, a device such as one of the devices 100 of FIG. 1 may include at least some of the features of the system 1100.

As shown in FIG. 11, the system 1100 includes a so-called chipset 1110. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 11, the chipset 1110 has a particular architecture, which may vary to some extent depending on brand or manufacturer. The architecture of the chipset 1110 includes a core and memory control group 1120 and an I/O controller hub 1150 that exchange information (e.g., data, signals, commands, etc.) via, for example, a direct management interface or direct media interface (DMI) 1142 or a link controller 1144. In the example of FIG. 11, the DMI 1142 is a chip-to-chip interface (sometimes referred to as being a link between a "northbridge" and a "southbridge").

The core and memory control group 1120 include one or more processors 1122 (e.g., single core or multi-core) and a memory controller hub 1126 that exchange information via a front side bus (FSB) 1124. As described herein, various components of the core and memory control group 1120 may be integrated onto a single processor die, for example, to make a chip that supplants the conventional "northbridge" style architecture.

The memory controller hub 1126 interfaces with memory 1140. For example, the memory controller hub 1126 may provide support for DDR SDRAM memory (e.g., DDR, DDR2, DDR3, etc.). In general, the memory 1140 is a type of random-access memory (RAM). It is often referred to as "system memory".

The memory controller hub 1126 further includes a low-voltage differential signaling interface (LVDS) 1132. The LVDS 1132 may be a so-called LVDS Display Interface (LDI) for support of a display device 1192 (e.g., a CRT, a flat panel, a projector, etc.). A block 1138 includes some examples of technologies that may be supported via the LVDS interface 1132 (e.g., serial digital video, HDMI/DVI, display port). The memory controller hub 1126 also includes one or more PCI-express interfaces (PCI-E) 1134, for example, for support of discrete graphics 1136. Discrete graphics using a PCI-E interface has become an alternative approach to an accelerated graphics port (AGP). For example, the memory controller hub 1126 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1150 includes a variety of interfaces. The example of FIG. 11 includes a SATA interface 1151, one or more PCI-E interfaces 1152 (optionally one or more legacy PCI interfaces), one or more USB interfaces 1153, a LAN interface 1154 (more generally a network interface), a general purpose I/O interface (GPIO) 1155, a low-pin count (LPC) interface 1170, a power management interface 1161, a clock generator interface 1162, an audio interface 1163 (e.g., for speakers 1194), a total cost of operation (TCO) interface 1164, a system management bus interface (e.g., a multi-master serial computer bus interface) 1165, and a serial peripheral flash memory/controller interface (SPI Flash) 1166, which, in the example of FIG. 11, includes BIOS 1168 and boot code 1190. With respect to network connections, the I/O hub controller 1150 may include integrated gigabit Ethernet controller lines multiplexed with a PCI-E interface port. Other network features may operate independent of a PCI-E interface.

The interfaces of the I/O hub controller 1150 provide for communication with various devices, networks, etc. For example, the SATA interface 1151 provides for reading, writing or reading and writing information on one or more drives 1180 such as HDDs, SDDs or a combination thereof. The I/O hub controller 1150 may also include an advanced host controller interface (AHCI) to support one or more drives 1180. The PCI-E interface 1152 allows for wireless connections 1182 to devices, networks, etc. The USB interface 1153 provides for input devices 1184 such as keyboards (KB), one or more optical sensors (see, e.g., the sensors 926 of FIG. 9), mice and various other devices (e.g., microphones, cameras, phones, storage, media players, etc.). On or more other types of sensors may optionally rely on the USB interface 1153 or another interface (e.g., $I^2C$, etc.). As to microphones, the system 1100 of FIG. 11 may include hardware (e.g., audio card) appropriately configured for receipt of sound (e.g., user voice, ambient sound, etc.).

In the example of FIG. 11, the LPC interface 1170 provides for use of one or more ASICs 1171, a trusted platform module (TPM) 1172, a super I/O 1173, a firmware hub 1174, BIOS support 1175 as well as various types of memory 1176 such as ROM 1177, Flash 1178, and non-volatile RAM (NVRAM) 1179. With respect to the TPM 1172, this module may be in the form of a chip that can be used to authenticate software and hardware devices. For example, a TPM may be capable of performing platform authentication and may be used to verify that a system seeking access is the expected system.

The system 1100, upon power on, may be configured to execute boot code 1190 for the BIOS 1168, as stored within the SPI Flash 1166, and thereafter processes data under the control of one or more operating systems and application software (e.g., stored in system memory 1140). An operating system may be stored in any of a variety of locations and accessed, for example, according to instructions of the BIOS 1168. Again, as described herein, a satellite, a base, a server or other machine may include fewer or more features than shown in the system 1100 of FIG. 11. Further, the system 1100 of FIG. 11 is shown as optionally include cell phone circuitry 1195, which may include GSM, CDMA, etc., types of circuitry configured for coordinated operation with one or more of the other features of the system 1100. Also shown in FIG. 11 is battery circuitry 1197, which may provide one or more battery, power, etc., associated features (e.g., optionally to instruct one or more other components of the system 1100).

Conclusion

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A lithium-ion battery package comprising:
  flexible foil;

a first conductor patch exposed on the flexible foil;
a second conductor patch exposed on the flexible foil;
a folded orientation of the flexible foil that comprises a contact between the first conductor patch and the second conductor patch; and
an expanded orientation of the flexible foil that comprises a space between the first conductor patch and the second conductor patch.

2. The lithium-ion battery package of claim 1 wherein the flexible foil comprises a polymer laminated aluminum foil.

3. The lithium-ion battery package of claim 1 further comprising one or more lithium-ion battery cells.

4. The lithium-ion battery package of claim 1 wherein the first conductor patch and the second conductor patch comprise conductor patches for a battery terminal.

5. The lithium-ion battery package of claim 4 wherein the battery terminal comprises a connected state dependent on existence of the contact and a disconnected state dependent on existence of the space.

6. The lithium-ion battery package of claim 1 wherein the flexible foil comprises a cup.

7. The lithium-ion battery package of claim 6 wherein the flexible foil comprises a cover portion, foldable to cover the cup.

8. The lithium-ion battery package of claim 1 wherein the flexible foil comprises a pouch.

9. The lithium-ion battery package of claim 1 comprising a side formed at least in part by overlapping portions of the flexible foil wherein the first conductor patch is exposed on one of the overlapping portions and wherein the second conductor patch is exposed on another one of the overlapping portions.

10. The lithium-ion battery package of claim 9 wherein the side comprises a battery terminal side.

11. The lithium-ion battery package of claim 1 comprising a positive battery terminal and a negative battery terminal wherein the first conductor patch and the second conductor patch provide for conduction of electricity either to the positive battery terminal or to the negative battery terminal.

12. The lithium-ion battery package of claim 1 wherein the flexible foil comprises an accordion fold.

13. The lithium-ion battery package of claim 1 further comprising a vent that comprises a closed state for the folded orientation and an open state for the expanded orientation.

14. The lithium-ion battery package of claim 1 wherein the flexible foil comprises an opening to form a vent.

15. A method comprising:
disposing a lithium-ion battery in a flexible foil package; and
sealing the flexible foil package to contain the lithium-ion battery,
wherein the flexible foil package comprises a pressure-sensitive disconnect to automatically disconnect a terminal of the lithium-ion battery responsive to pressure generated in the sealed package due to release of gas by the lithium-ion battery and
wherein the pressure-sensitive disconnect comprises overlapping portions of flexible foil of the flexible foil package.

16. The method of claim 15 wherein the flexible foil package further comprises a vent that automatically opens responsive to pressure generated due to release of gas by the lithium-ion battery.

17. A system comprising:
system components; and
a lithium-ion battery package that comprises flexible foil,
a first conductor patch exposed on the flexible foil,
a second conductor patch exposed on the flexible foil,
a folded orientation of the flexible foil that comprises a contact between the first conductor patch and the second conductor patch, and
an expanded orientation of the flexible foil that comprises a space between the first conductor patch and the second conductor patch.

18. The system of claim 17 wherein the system is an information handling device wherein the system components comprise one or more processors.

19. The system of claim 17 wherein the system is an electric vehicle wherein the system components comprise one or more electric motors which provide the vehicle with locomotion.

20. The system of claim 19 wherein the vehicle comprises an automobile.

21. A device comprising:
a processor;
memory;
a display; and
a lithium-ion battery package that comprises flexible foil,
a first conductor patch exposed on the flexible foil,
a second conductor patch exposed on the flexible foil,
a folded orientation of the flexible foil that comprises a contact between the first conductor patch and the second conductor patch, and
an expanded orientation of the flexible foil that comprises a space between the first conductor patch and the second conductor patch.

22. The device of claim 21 comprising a network interface.

23. The device of claim 21 comprising a compartment configured for receipt of the lithium-ion battery package.

24. The device of claim 21 comprising cell phone circuitry.

* * * * *